Dec. 20, 1949 — H. W. WALDEN — 2,491,698
SHOCK-ABSORBING WHEEL
Filed Sept. 7, 1945

Henry W. Walden
INVENTOR
By L. H. Amder
ATTORNEY

Patented Dec. 20, 1949

2,491,698

UNITED STATES PATENT OFFICE 2,491,698

SHOCK-ABSORBING WHEEL

Henry W. Walden, New York, N. Y.

Application September 7, 1945, Serial No. 614,860

2 Claims. (Cl. 152—47)

This invention relates to wheels for automobiles, motorcycles and other land vehicles, and to landing wheels for airplanes. One of the objects of the invention is to provide a wheel for the purposes described which will have inherent resilience to take up shock and which will provide exceptionally smooth riding characteristics. The improved shock-absorbing wheel of this invention is shown in connection with a wheel having a pneumatic tire, but it will be understood that the improved wheel need not be provided with a pneumatic tire, inasmuch as its inherent resilience is sufficient to take up shock and permit smooth riding independently of the pneumatic tire.

Another object of the invention is to provide a shock-absorbing wheel as described which may be economically produced and which can be readily installed in land vehicles or airplanes. Another object of this invention is to provide a shock-absorbing wheel which may be adjusted to provide the proper resilience and shock-absorbing properties for the conditions—such as load, speed, road conditions, etc.—of the particular installation.

For the attainment of the foregoing and such other objects as may appear or be pointed out herein, an embodiment of the invention is shown in the accompanying drawing, wherein.

Figure 1:
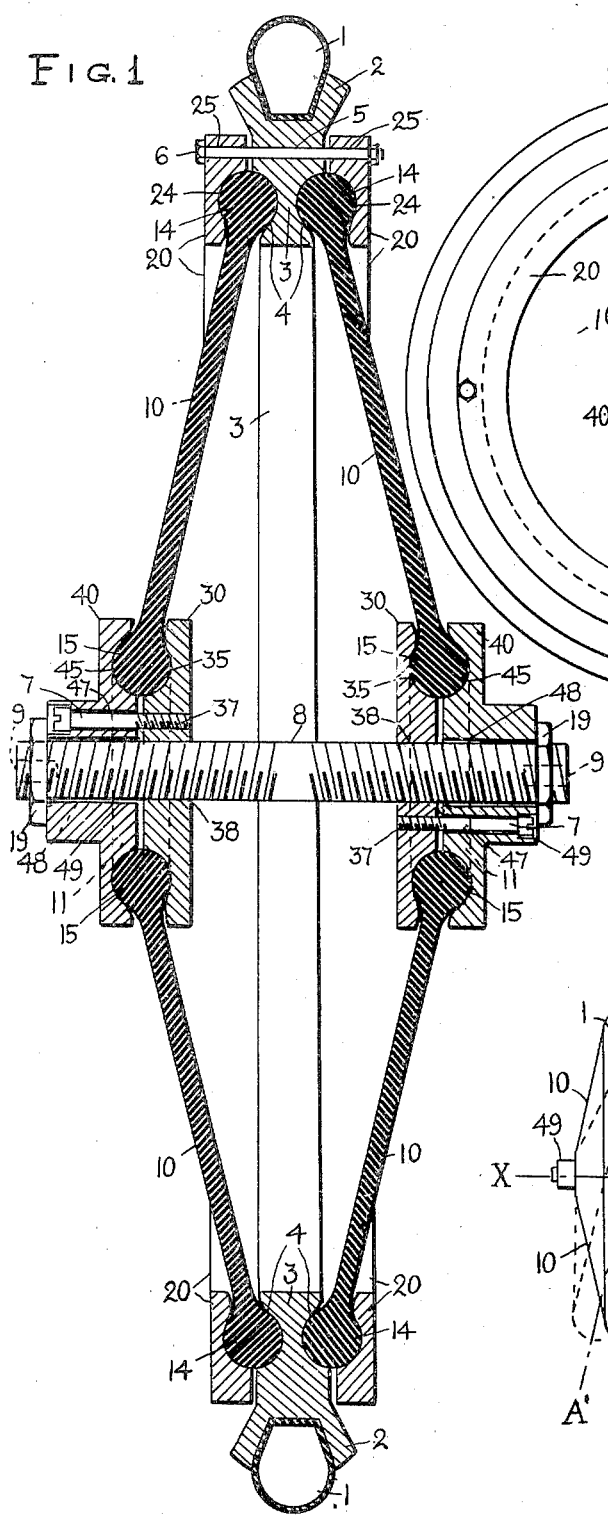
Fig. 1 is a sectional elevation through the improved wheel.
Figure 2:
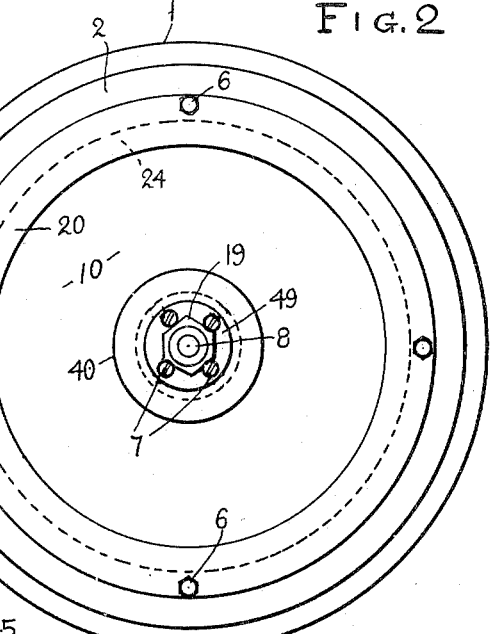
Fig. 2 is a front view of the improved wheel, on a scale reduced from that of Fig. 1.

The improved resilient wheel is shown in the accompany drawing provided with a pneumatic tire 1 held in place on the usual type of bifurcated flanged rim 2. Rim 2 has an inwardly disposed annular flange 3, and is maintained in position relative to the hub axis of the wheel—in a manner subsequently described—by a pair of thick rubber diaphragms 10, one at each side of the wheel. Rubber diaphragms 10 have a central opening 11 and are provided with a peripheral or distal enlargement or bead 14 and an inner or proximal enlargement or bead 15 which defines the central opening 11. The main body of rubber diaphragms 10 is elastic; the beaded portions 14, 15, may be corded, for additional strength at these points. The peripheral bead 14 of rubber diaphragms 10 serves to secure the outer perimeter of the diaphragms to wheel rim 2, more particularly, to the annular flange 3 of the rim. For this purpose, the side faces of annular flange 3 are provided with an annular cavity or groove 4 in which substantially half of the peripheral bead 14 snugly fits. After seating the peripheral beads 14 of the two rubber diaphragms 10 in their respective annular grooves 4 of rim flange 3, the distal perimeters of the rubber diaphragms are secured to the rim by means of a pair of perimetric rings 20, one on each side of the wheel. Perimetric rings 20 are provided with annular cavities or grooves 24 in which the outward substantial half of the peripheral beads 4 snugly fit. Perimetric rings 20 are secured to the annular flange 3 of the wheel rim, as by means of through bolts 6 passed through aligned holes 25 in the rings 20 and holes 5 in the annular rim flange 3.

The proximal beads 15 of rubber diaphragms 10 are secured between a pair of hub discs, one pair of such discs being provided on each side of the wheel, for the respective rubber diaphragm 10. Each pair of hub discs comprises an inner disc 30 and an outer disc 40. Inner discs 30 are provided with an annular cavity or groove 35 in which substantially half of the proximal bead 15 of rubber diaphragms 10 snugly fit, while the outward substantially half of the beads are received in an annular cavity or groove 45 provided in the outer discs 40. Outer and inner discs, 40, 30 of each pair of hub discs are secured together, as by means of stud bolts 7 which pass through holes 47 in the outer discs 40 and screw into tapped holes 37 in the inner discs 30.

Inner hub discs 30 are provided with a central tapped opening 38, one of which is tapped right-hand and the other, left-hand, to receive the respective threads of a spindle 8, half of which is, correspondingly, threaded right-hand and the other half, left-hand. The outer hub discs 40 are provided with a central clearance opening 48 for the spindle 8; the central clearance openings 48 of the outer discs 40 also extend through hubs 49 which are provided on the outward faces of the discs 40. The improved wheel is mounted on the land vehicle or airplane by means of the hubs 49. Means, such as sockets 9, at each end of threaded spindle 8, is provided for mounting and dismounting the improved wheel, as will be described. Nuts 19 at each end of the spindle 8 are provided for locking the hub discs 30, 40 and spindle 8.

The improved wheel is assembled by first turning threaded spindle 8—by a crank tool inserted in one of its end sprockets 9—in a direction to bring the inner discs 30 close together. The rubber diaphragms 10 are then placed in position with their peripheral beads 14 received in the respective annular grooves 4 of rim flange 3 and with their proximal beads 15 received in the respective annular grooves 35 of the inner discs 30. The perimetric rings 20 are then bolted to the annular rim flange 3 to firmly secure the peripheral beads 14 of the rubber diaphragms 10 to the rim; the outer hub discs 40 are next bolted to the inner discs 30 to firmly secure the proximal beads 15 of rubber diaphragms 10 to the hub discs. When the rubber diaphragms are initially positioned as described, the rubber is under no tension. The threaded spindle is next turned to cause the inner discs 30, together with their companion outer disc 40, 40, to move outwardly away from one another, to the position shown in Fig. 1, and the parts are locked in position, by nuts 19.

In the assembled position, as shown in Fig. 1, the rubber diaphragms are under tension, by reason of the outward movement of their proximal beads 15. The parts are designed so that rubber diaphragms 10 will be tensioned to the desired extent and so that a sufficient distance or "hub base" will be provided between the proximal beads of the rubber diaphragms. The amount of tensioning imparted to the rubber diaphragms and the "hub base" distance between the hub discs 30, 40, may be adjusted to provide the proper resilience and operational characteristics for different conditions.

The load of the vehicle or airplane is carried by the hubs 49, and this load is, in turn, carried by the wheel rim, being transmitted to the upper portion of the rim by that portion of the rubber diaphragms disposed between the upper rim portion and the hub of the wheel. It is thus seen that the vehicle load is carried by suspension from the upper portion of the rim, by the upper half of the rubber diaphragms. Thus, the rubber diaphragms in supporting the vehicle, are placed under tension; no part of the load is carried by compression of the rubber diaphragms. While the imposition of the load on hubs 49 will cause some tensile stretching of the upper portion of the rubber diaphragms (between the hub and the upper rim portion), and subsequent lowering of the hub, there will be little crimping of the lower portion of the rubber diaphragms (between the hub and the lower rim portion) by reason of the fact that the original tensioning of the rubber diaphragms, in mounting the wheel as described, will be sufficient to take up most of the crimping or compression of the lower diaphragm portion.

Figure 3:
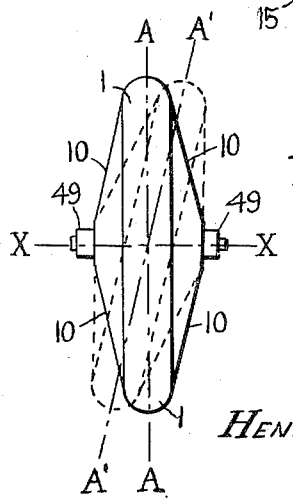
Fig. 3 is a side view of the improved wheel, illustrating lateral deflection of the wheel about its axis.

The improved wheel, by reason of the stretching properties of its diaphragms, will permit lateral deflection of the rim relative to the hub axis, as shown in Fig. 3. The rim 1, hubs 49 and rubber diaphragms 10 of the improved wheel are shown in solid lines in Fig. 3 in normal running condition, with a plane A—A through the wheel normal to hub axis X—X. Upon encountering an obstacle, such as a large rock, the improved wheel will be deflected laterally, in Fig. 3, towards the right or clockwise, to the position A'—A', shown in dot-and-dash lines. This lateral deflection will tension the rubber diaphragms 10 and not only limit the extent of deflection, but immediately return the wheel to normal position. Such lateral deflection will enable a land vehicle to more easily negotiate banked curves. When used for airplane landing wheels, lateral deflection of the improved wheels will take up lateral forces and wind, and thus will prevent tipping of the wing.

Figure 4:
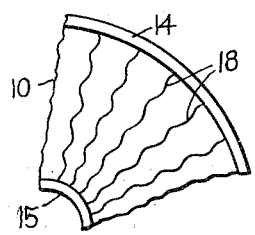
Fig. 4 is a fragmentary view of the rubber diaphragm provided with sinuous wires for imposing a limit to its extent of stretch.

The extent of stretching of the rubber diaphragms 10 may be positively limited, as shown in Fig. 4, by embedding sinuous wires 18 in the rubber diaphragm 10 with their ends preferably extending to the peripheral bead 14 and the proximal bead 15. The sinuous wires 18 are radially disposed, as shown in Fig. 4. As portions of the diaphragm extend under tension, the sinuous wires 18 associated with the extended diaphragm portions straighten out, their straightened lengths imposing a positive stop to further extension of the diaphragm portion under tension.

I claim:

1. In a wheel of the class described, in combination, a rim centrally disposed on the central diametric plane of the wheel and having an inwardly disposed annular flange, a perimetric ring for each side of the said rim flange, a pair of rubber diaphragms having a peripheral bead, the facing sides of the said rim flange and its respective perimetric ring being provided with matching annular grooves for the said peripheral bead of the respective rubber diaphragms, means for fastening the said rim flange and perimetric rings to secure the peripheral beads of the rubber diaphragms, a pair of inner discs disposed at the center of the wheel and equi-distanced from its said central diametric plane, an outer disc for each of said pair of inner discs, the said pair of rubber diaphragms having a proximal bead defining a central opening, the facing sides of the said two inner discs and their respective outer discs being provided with matching annular grooves for the said proximal beads of the respective rubber diaphragms, means for fastening each pair of inner and outer discs to secure the proximal beads of the rubber diaphragms, the upper portions of said pair of rubber diaphragms being placed under tension by the load at said pair of mated discs, and means for equalizing and regulating the said tension, comprising means for adjusting the distance between said pair of mated inner and outer discs and for maintaining them equi-distanced at all times from the said central diametric plane of the wheel, said adjusting means comprising a left-and-right-threaded spindle disposed on the wheel axis and cooperative with the said discs.

2. In a wheel of the class described, in combination, a rim centrally disposed on the central diametric plane of the wheel and having an inwardly disposed annular flange, a perimetric ring for each side of the said rim flange, a pair of rubber diaphragms having a peripheral bead, the facing sides of the said rim flange and its respective perimetric ring being provided with matching annular grooves for the said peripheral bead of the respective rubber diaphragms, means for fastening the said rim flange and perimetric rings to secure the peripheral beads of the rubber diaphragms, a pair of inner discs disposed at the center of the wheel and equi-distanced from its said central diametric plane, an outer disc for each of said pair of inner discs, the said pair of rubber diaphragms having a proximal bead defining a central opening, the facing sides of the said two inner discs and their respective outer discs being provided with matching annular grooves for the said proximal beads of the respective rubber diaphragms, means for fastening each pair of inner and outer discs to secure the proximal beads of the rubber diaphragms, the said pair of rubber diaphragms being provided with a plurality of embedded, radially disposed sinuous wires of inflexible material, equi-spaced about the circumference, the outer ends of the wires being anchored in the peripheral beads, with their inner ends anchored in the proximal beads, of the pair of rubber diaphragms.

HENRY W. WALDEN.

REFERENCES CITED

The following references are of record in the file of this patent:

UNITED STATES PATENTS

| Number | Name | Date |
|---|---|---|
| 933,748 | Day | Sept. 14, 1909 |
| 1,260,727 | Steinberg | Mar. 26, 1918 |
| 1,306,730 | Willis et al. | June 17, 1919 |
| 1,446,922 | Morse | Feb. 27, 1923 |
| 1,588,481 | Lord | June 15, 1926 |

FOREIGN PATENTS

| Number | Country | Date |
|---|---|---|
| 249,158 | Italy | Apr. 26, 1926 |
| 523,349 | France | of 1921 |